(12) United States Patent
Huxel

(10) Patent No.: US 7,181,009 B1
(45) Date of Patent: Feb. 20, 2007

(54) GENERATING MESSAGE DIGESTS ACCORDING TO MULTIPLE HASHING PROCEDURES

(75) Inventor: Jeffrey A. Huxel, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 834 days.

(21) Appl. No.: 10/323,168

(22) Filed: Dec. 18, 2002

(51) Int. Cl.
*H04L 9/00* (2006.01)

(52) U.S. Cl. ........................... 380/28; 713/168
(58) Field of Classification Search ............ 380/28–30, 380/44; 713/168, 170, 180, 181
See application file for complete search history.

(56) References Cited

U.S. PATENT DOCUMENTS

| | | | |
|---|---|---|---|
| 2002/0001384 A1 | 1/2002 | Buer et al. | 380/30 |
| 2002/0032551 A1 | 3/2002 | Zakiya | 703/2 |
| 2002/0066014 A1 | 5/2002 | Dworkin et al. | 713/168 |
| 2002/0184498 A1* | 12/2002 | Qi | 713/168 |
| 2002/0191783 A1* | 12/2002 | Takahashi | 380/28 |

OTHER PUBLICATIONS

William Stallings, *Cryptography and Network Security: Principles and Practice* (2nd Edition), Chapter 9/Hash Algorithms, Prentice Hall; ISBN: 0138690170; 2nd edition, pp. 272-293, Jul. 15, 1998.
R. Rivest, *The MD5 Message-Digest Algorithm*; Network Working Group, MIT Laboratory for Computer Science and RSA Data Security, Inc., pp. 1-21, Apr. 1992.
*Secure Hash Standard*, Federal Infromation Processing Standards Publication 180-1; Supersedes FIPS PUB 180, May 11, 1993, pp. 1-18, Apr. 17, 1995.

* cited by examiner

*Primary Examiner*—Kim Vu
*Assistant Examiner*—Nirav Patel
(74) *Attorney, Agent, or Firm*—Baker Botts L.L.P.

(57) ABSTRACT

Generating a message digest includes selecting a first hashing procedure or a second hashing procedure for a message having words. If the first hashing procedure is selected, a first function is applied to a first subset of words at a function module to yield a first function output, and a second subset of words and the first function output are combined at an adder to yield a first sum. Next words are generated in accordance with the first sum. If the second hashing procedure is selected, a second function is applied to a third subset of words at the function module to yield a second function output, and a fourth subset of words and the second function output are combined at the adder to yield a second sum. Next words are generated in accordance with the second sum.

10 Claims, 6 Drawing Sheets

GENERATING MESSAGE DIGESTS ACCORDING TO MULTIPLE HASHING PROCEDURES

TECHNICAL FIELD OF THE INVENTION

This invention relates generally to the field of data integrity and more specifically to generating message digests according to multiple hashing procedures.

BACKGROUND OF THE INVENTION

Hashing procedures may be used to ensure data integrity by detecting changes in a transmitted message caused by, for example, transmission error or tampering. Circuits for implementing hashing procedures, however, are typically large and complicated, requiring a significant amount of space. Consequently, implementing hashing procedures has posed problems in some situations.

SUMMARY OF THE INVENTION

In accordance with the present invention, disadvantages and problems associated with previous techniques for generating message digests may be reduced or eliminated.

According to one embodiment of the present invention, generating a message digest includes selecting a first hashing procedure or a second hashing procedure for a message having words. The words are received at a hash engine that has a function module and an adder. The following is performed to yield a first chaining variable if the first hashing procedure is selected. A first function is applied to a first subset of words at the function module to yield a first function output, and a second subset of words and the first function output are combined at the adder to yield a first sum. Next words are generated in accordance with the first sum.

The following are performed to yield a second chaining variable if the second hashing procedure is selected. A second function is applied to a third subset of words at the function module to yield a second function output, and a fourth subset of words and the second function output are combined at the adder to yield a second sum. Next words are generated in accordance with the second sum.

A first message digest for the message is determined using the first chaining variable if the first hashing procedure is selected, and a second message digest for the message is determined using the second chaining variable if the second hashing procedure is selected.

Certain embodiments of the invention may provide one or more technical advantages. A technical advantage of one embodiment may be that shared circuit components may be used to implement multiple hashing procedures. The shared circuit components may reduce the size of a circuit that performs multiple hashing procedures.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 11 of the drawings, like numerals being used for like and corresponding parts of the various drawings.

Figure 1:
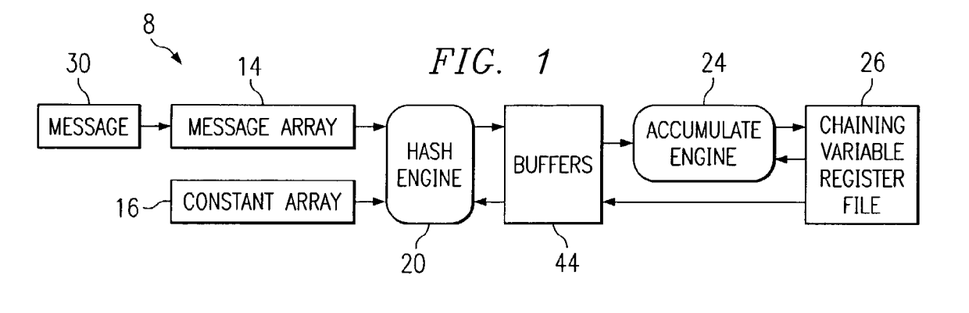
FIG. 1 is a block diagram illustrating one embodiment of a system for generating a message digest from an input message.

FIG. 1 is a block diagram illustrating one embodiment of a system 8 for generating a message digest from an input message 30. System 8 is operable to generate the message digest according to one of a plurality of hashing procedures using shared circuitry for the procedures. A hashing procedure comprises a procedure for generating a message digest for a message. According to one embodiment, system 8 generates message digests according to a message-digest, version 5 (MD5) procedure and a secure hash algorithm (SHA) procedure, which are described in more detail with reference to FIGS. 2, 3, and 4 respectively.

Figure 2:
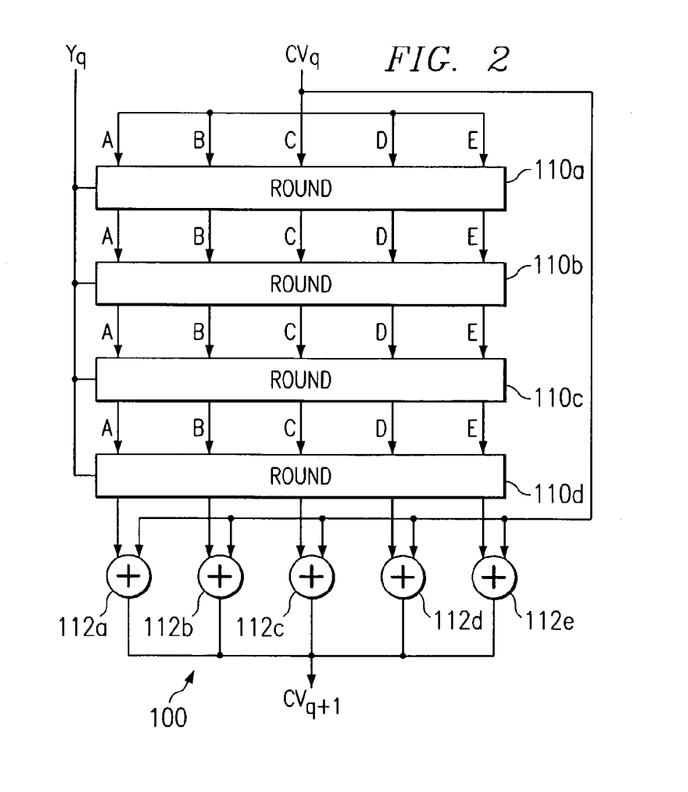
FIG. 2 is a diagram illustrating the generation of a message digest from an input message.

FIG. 2 is a diagram 100 illustrating the generation of a message digest from input message 30. Message 30 is processed as a sequence of blocks, where each block comprises a sequence of words. As used in this document, "each" refers to each member of a set or each member of a subset of the set. According to the MD5 procedure, a message digest may be generated using Equations (1) through (3):

$$CV_0 = IV \tag{1}$$

$$CV_{q+1} = \text{SUM}_{32}(CV_q, RF_I[Y_q, RF_{H[Y_q}, RF_G[Y_q, RF_F[Y_q, CV_q]]]]) \tag{2}$$

$$MD = CV_L \tag{3}$$

where:

| | |
|---|---|
| $IV$ = | initial value of chaining variable register file 26; |
| $Y_q$ = | qth block of message 30; |
| $L$ = | number of blocks of message 30; |
| $CV_q$ = | chaining variable processed with the qth block of message 30; |
| $RF_x$ = | round function using primitive logical function x; |

-continued

| | |
|---|---|
| MD = | final message digest value; and |
| $SUM_{32}$ = | addition module $2^{32}$ performed separately on each word of a pair of inputs. |

According to the SHA procedure, a message digest value may be generated using Equations (4) through (6):

$$CV_0 = IV \quad (4)$$

$$CV_{q+1} = SUM_{32}(CV_q, ABDCE_q) \quad (5)$$

$$MD = CV_L \quad (6)$$

where:

| | |
|---|---|
| IV = | initial value of buffers 44; |
| $ABCDE_q$ = | output of the last round of processing of the qth message block; |
| L = | number of blocks of message 30; |
| $SUM_{32}$ = | addition module $2^{32}$ performed separately on each word of a pair of inputs; and |
| MD = | final message digest value. |

Diagram 100 illustrates the computation of a chaining variable $CV_{q+1}$ from a previous chaining variable $CV_q$ according to the MD5 procedure and the SHA procedure. Chaining variable $CV_q$ is divided into words for buffers 44, labeled A, B, C, and D, for MD5 procedure or words for buffers 44, labeled A, B, C, D, and E, for the SHA procedure.

At each round 110, the words at the qth block of message 30 are processed. The processing at each round 110 depends on the procedure, and is described in more detail with reference to FIGS. 3 and 4. Adders 112 add the words of chaining variable $CV_q$ to the resulting words of round 110d to generate the words of the next chaining variable $CV_{q+1}$.

Figure 3:
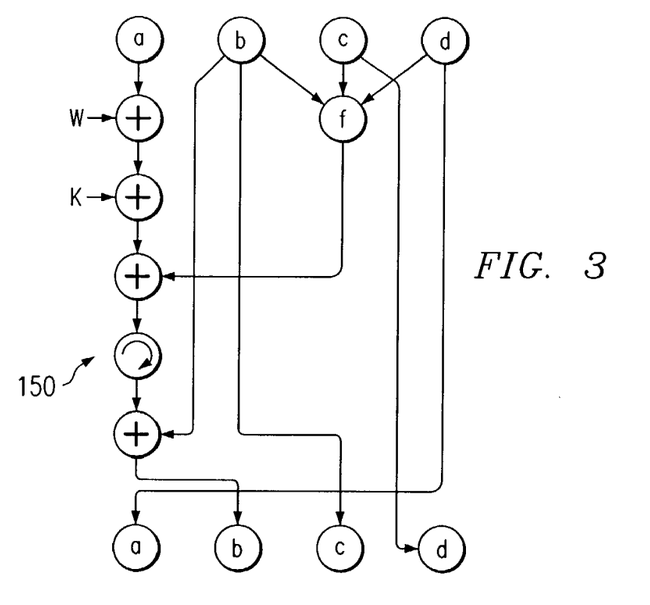
FIG. 3 is a diagram illustrating the calculation at one step of a round of FIG. 2 according to the MD5 procedure.

FIG. 3 is a diagram 150 illustrating the calculation at one step of a round 110 of FIG. 2 according to the MD5 procedure. Each round 110 comprises sixteen steps, where each step may be described using Expression (7):

$$a, b, c, d \leftarrow d, (b+((a+f(b, c, d)+W[k]+K[i])<<<s)), b, c \quad (7)$$

where

| | |
|---|---|
| a, b, c, d = | words of buffers 44; |
| f = | primitive logical function; |
| <<<s = | circular left shift of a 32-bit argument by s bits; |
| W[k] = | M[q × 16 + k] = kth word of the qth block of message 30; |
| K[i] = | ith word of matrix T; and |
| + = | addition modulo $2^{32}$ |

According to diagram 150, word a and a derived word W are added to yield sum a+W. An entry K is added to sum a+W to yield sum a+W+K. Function f is applied to words b, c, and d to yield output f(b,c,d). Output f(b,c,d) is added to sum a+w+K to yield sum a+W+K+f (b, c, d). Sum a+W+K+f(b,c,d) is rotated and added to word b to yield result R. Result R becomes new word b. Word b becomes new word c, word c becomes new word d, and word d becomes new word a.

Figure 4:
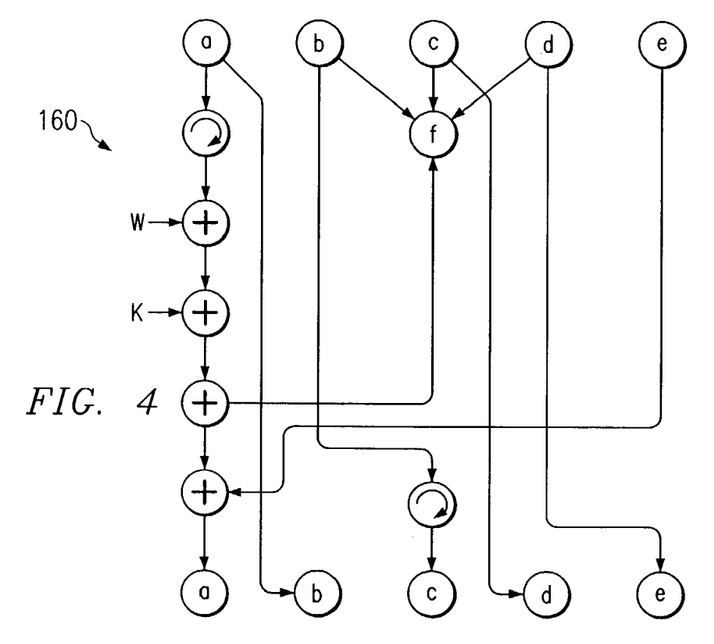
FIG. 4 is a diagram illustrating the calculation at one step of a round of FIG. 2 according to the SHA procedure.

FIG. 4 is a diagram 160 illustrating the calculation at one step of a round 110 of FIG. 2 according to the SHA procedure. Each round 110 comprises twenty steps, where each step may be described using Expression (8):

$$a,b,c,d,e \leftarrow (e+f(t,b,c,d)+S^5(a)+W_t+K_t),a,S^{30}(b),c,d \quad (8)$$

where

| | |
|---|---|
| a, b, c, d, e = | words of buffers 44; |
| t = | step number where $0 \leq t \leq 79$; |
| f(t, b, c, d) = | primitive logical function for step t; |
| $S^k$ = | circular left shift (rotation) of the 32-bit argument by k bits; |
| $W_t$ = | word derived from the current input block; |
| $K_t$ = | an additive constant; and |
| + = | addition modulo $2^{32}$. |

According to diagram 160, word a is rotated and added to derived word W to yield sum a+W. Entry K is added to a+W to yield sum a+W+K. Function f is applied to words b, c, and d to yield output f(b, c, d), which is added to sum a+W+K to yield sum a+W+K+f(b,c,d). Word e is added to sum a+W+K+f (b, c, d) to yield result R. Result R becomes new word a. Word b is rotated. Word a becomes new word b, rotated word b becomes new word c, word c becomes new word d, and word d becomes new word e.

To summarize, the MD5 procedure and the SHA procedure process the words of message 30 using derived word W, primitive function f, and entry K selected from a table.

Referring back to FIG. 1, system 8 provides for computation of a message digest according to the MD5 procedure or the SHA procedure using shared circuitry for the procedures. Circuits of system 8 are operable to generate words for each step of a round according to one of a plurality of hashing procedures using shared circuitry for the procedures. The words are sent to accumulate engine 24.

According to the illustrated embodiment, a message 30 is received by system 8. Specifically, message 30 may be one of any suitable length, and may be processed into words of a predetermined size. For example, message 30 may be processed into a sequence of blocks that are a predetermined size such as 512 bits. Each block may comprise a predetermined number of words of a suitable size such as sixteen words of 32 bits. A message array 14 generates derived word W from message 30. Derived word W for a next round may be generated during a current round and may be stored in registers that are reused at each round. Message array 14 is described in more detail with reference to FIG. 5.

A constant array 16 is used to retrieve entry K. Constant array 16 includes entries K used for the MD5 procedure and the SHA procedure. Entries K used for the MD5 procedure may be placed in a matrix T[1, 2, . . . , 64] that is constructed from the sine function. The ith element T[i] of matrix T has a value equal to the integer part of $2^{32} \times abs(sin(i))$, where i is in radians. Because abs(sin(i)) is a number between 0 and 1, each element of matrix T is an integer that can be represented by 32 bits. Matrix T provides a randomized set of 32-bit patterns, which may eliminate any irregularities of message 30.

Entries K used for the SHA procedure may include additive constants $K_t$, where t indicates one of the eighty steps of four rounds 110. The additive constants K may be defined using TABLE 1.

TABLE 1

| Step Number | Hexadecimal | Take Integer Part of: |
| --- | --- | --- |
| $0 \leq t \leq 19$ | $K_t$ = 5a827999 | $[2^{30} \times \sqrt{2}]$ |
| $20 \leq t \leq 39$ | $K_t$ = 6ed9eba1 | $[2^{30} \times \sqrt{3}]$ |
| $40 \leq t \leq 59$ | $K_t$ = 8f1bbcdc | $[2^{30} \times \sqrt{5}]$ |
| $60 \leq t \leq 79$ | $K_t$ = ca62c1d6 | $[2^{30} \times \sqrt{10}]$ |

Constant Array 16 retrieves entries K according to the MD5 procedure or the SHA procedure. In the MD5 procedure, constant array 16 retrieves the ith word of matrix T. In the SHA procedure, constant array 16 retrieves constant K according to TABLE 1.

A hash engine 20 is used to generate words at each step of a round according to either the MD5 procedure or the SHA procedure using derived word W from message array 14 and entry K from constant array 16. Hash engine 20 is described in more detail with reference to FIG. 6.

Buffers 44 are used to store words generated by hash engine 20 regardless of whether an MD5 or an SHA procedure is being used. Buffers 44 receive words from the chaining variable register file 26 or the result of hash engine 20. Buffers 44 are described in more detail with reference to FIG. 7. An accumulate engine 24 is used to generate an accumulate result from words of buffers 44 and from chaining variables of a chaining variable register file 26. Accumulate engine 24 may retrieve words for either the SHA or the MD5 procedure from a minimum number of buffers 44. Accumulate engine 24 is described in more detail with reference to FIG. 8. Chaining variable register file 26 generates chaining variables from the accumulate result from accumulate engine 24. Chaining variable register file 26 is described in more detail with reference to FIG. 9.

Figure 5:
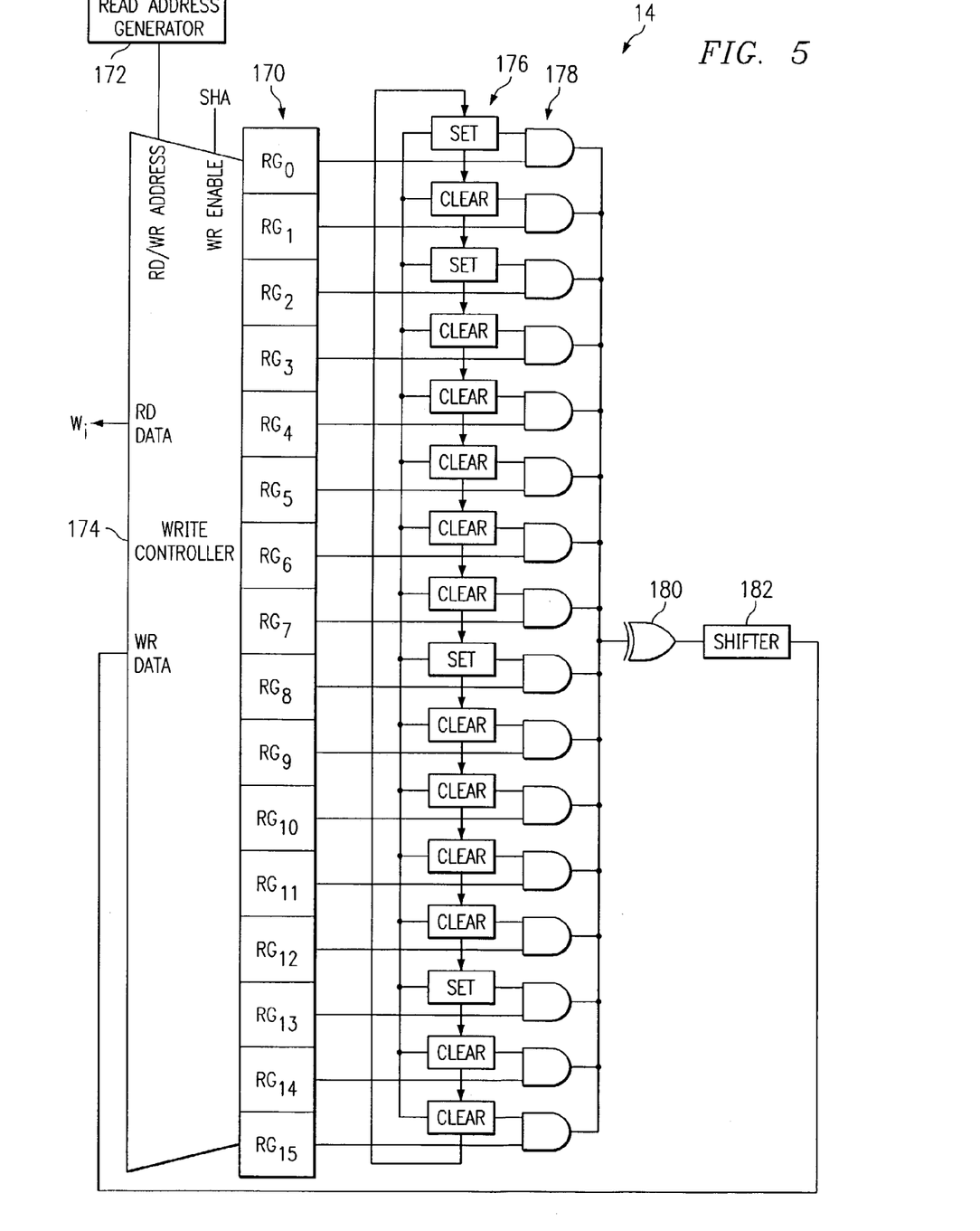
FIG. 5 is a block diagram illustrating one embodiment of the message array of FIG. 1.

FIG. 5 is a block diagram illustrating one embodiment of message array 14 of FIG. 1 that may be used to generate derived word W. Message array 14 may reuse registers 170 by generating a derived word W for a next round during a current round, and storing the derived word W for the next round in registers 170 during the current round.

Specifically, message array 14 includes a read address generator 172 and a write controller 174. Read address generator 172 generates an appropriate address to cause write controller 174 to supply the correct word from the registers 170. Write controller 174 is used to select whether derived words W are to be generated according to the SHA procedure. Registers 170 store the words of message 30 and generated derived words for the SHA procedure. Although the illustrated example shows sixteen registers 170, any suitable number of registers 170 may be used.

Selectors 176 and AND gates 178 are used to select certain words to be transmitted to an XOR gate 180. In the illustrated example, "set" indicates a word that is selected, and "clear" indicates a word that is not selected. XOR gate 180 performs an exclusive-or operation on the selected words. A shifter 182 shifts the output of XOR gate 180.

According to one embodiment, register file 170 receives the words of message 30. Controller 174 selects words from register file 170 to be the derived word W from the words received from register file 170. According to the MD5 procedure, derived word W[k] comprises the kth word of the qth block of message 30. According to the SHA procedure, the first sixteen values of derived word $W_t$ may be selected from the sixteen words of the current block. The remaining values of derived word W may be defined using Equation (9):

$$W_t = S^1(W_{t-16} \oplus W_{t-14} \oplus W_{t-8} \oplus W_{t-3}) \quad (9)$$

In operation, to generate derived word $W_i$ for step i according to the process described with reference to Equation (9), registers 170 receive the words of message 30. In the illustrated example, word $W_i$ is received at register $RG_i$. For the first sixteen steps of the first round, word $W_i$ at register $RG_i$ is sent to hash engine 20 at step i, for example, word $W_0$ is sent at step 0. During the current round, words of next rounds are generated. For example, at step 0, word $W_{16}$ of the next round is generated. The word may be generated by selecting words according to Equation (9) using selectors 176 and AND gates 178, and performing an exclusive-or operation on the selected words using an XOR gate 180. Word $W_{16}$ is stored at register $RG_0$ during the current round after word $W_0$ has been sent to hash engine 20.

At the steps of a current round, words of the next round may be generated. Selectors 176 may be adjusted to select the words from registers 170 according to Equation (9). Accordingly, message array 14 may be used to efficiently generate words for a next round during a current round, and store the words for the next round in registers 170 during the current round.

Message array 14 may include more, fewer, or other features or may have an alternative configuration. For example, a different configuration of gates may be in place of selectors 176 and AND gates 178 to select words.

Figure 6:
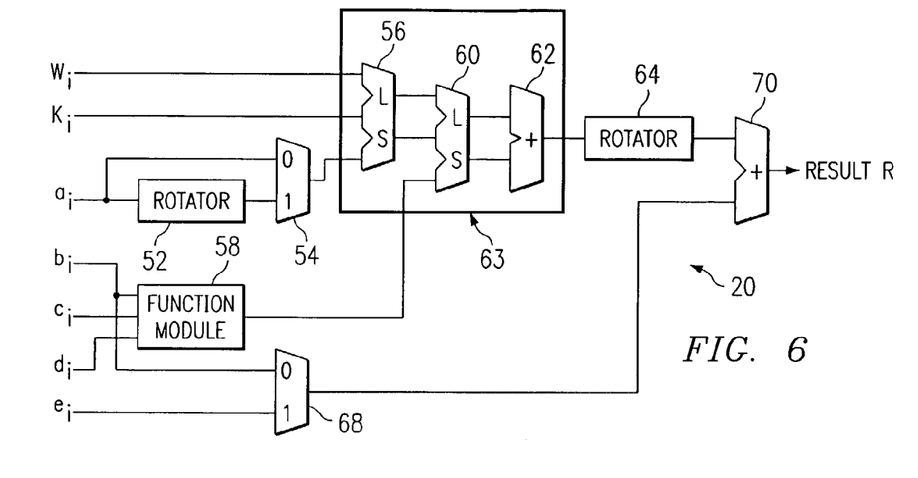
FIG. 6 is a block diagram illustrating one embodiment of the hash engine of FIG. 1.

FIG. 6 is a block diagram illustrating one embodiment of hash engine 20 of FIG. 1. Hash engine 20 receives derived word $W_i$, entry $K_i$, and words $a_i$, $b_i$, $c_i$, $d_i$, and $e_i$ for step i. A rotator 52 performs a circular left rotation of word $a_i$ by a predetermined number of bits. According to Expression (8), word $a_i$ is shifted by five bits for the SHA procedure. Multiplexer 54 transmits word $a_i$ if the MD5 procedure is being performed, and transmits word $a_i$ rotated by rotator 52 if the SHA procedure is being performed.

A function module 58 performs a function on words $b_i$, $c_i$, and $d_i$. Function module 58 may comprise circuits that perform the operations as described by the following Expressions (10) through (14):

$$(b \wedge c) \wedge (\bar{b} \wedge d) \quad (10)$$

$$(b \wedge d) \wedge (c \wedge d) \quad (11)$$

$$b \oplus c \oplus d \quad (12)$$

$$c \oplus (b \wedge \bar{d}) \quad (13)$$

$$(b \wedge d) \wedge (b \wedge d) \wedge (c \wedge d) \quad (14)$$

According to the MD5 procedure, function module 58 uses the circuit for Expression (10) to perform a function $F_1$ at round 110a, Expression (11) to perform a function $F_2$ at round 110b, Expression (12) to perform a function $F_3$ at round 110c, and Expression (13) to perform function $F_4$ at round 110d. According to the SHA procedure, function module 58 uses the circuit for Expression (10) to perform function $G_1$ at round 110a, Expression (12) to perform function $G_2$ at round 110b, Expression (14) to perform function $G_3$ at round 110c, and Expression (12) to perform function $G_4$ at round 110d.

Adder 63 adds the derived word $W_i$, the entry $K_i$, the value received from multiplexer 54, and the value received from the function module 58. Adder 63 includes circuits to add four 32-bit numbers to produce one 32-bit result. As shown, adder 63 comprises a carry-save adder 56 that receives the derived word $W_i$, entry $K_i$, and value received from the multiplexer 54. A second carry save adder 60 receives the two outputs of the carry save adder 56 and the value received form the function generator 58. Adder 62 receives the two results of the second carry save adder 60 and produces a 32-bit result.

A rotator 64 rotates the output of adder 63. For the MD5 procedure, rotator performs a circular left shift by a number of bits determined by the current round. For the SHA procedure, rotator 64 performs a circular left shift of zero bits. A multiplexer 68 transmits word $b_i$ if the MD5 procedure is being performed, and transmits word $e_i$ if the SHA procedure is being performed. An adder 70 adds the rotated output received from rotator 64 and the value received from multiplexer 68 in order to generate a result.

In operation, hash engine 20 performs the MD5 procedure in the following manner. Multiplexer 54 passes through word $a_i$. Function module 58 performs function f on words $b_i$, $c_i$, $d_i$ to yield output $f(b_i, c_i, d_i)$. Adder 63 performs an addition operation on derived word $W_i$, entry $K_i$, word $a_i$, and output $f(b_i, c_i, d_i)$ to yield sum $W_i+K_i+a_i+f(b_i, c_i, d_i)$. Rotator 64 performs a circular shift left rotation on sum $W_i+K_i+a_i+f(b_i, c_i, d_i)$ by an amount determined by the current round to yield rotated sum $W_i+K_i+a_i+f(b_i, c_i, d_i)$. Multiplexer 68 passes through word $b_i$. Adder 70 performs an addition operation on the rotated sum $W_i+K_i+a_i+f(b_i, c_i, d_i)$ and word $b_i$ to yield result R.

In operation, hash engine 20 performs the SHA procedure in the following manner. Rotator 52 performs a circular shift left rotation on word $a_i$. Function module 58 performs function f on words $b_i$, $c_i$, and $d_i$ to yield output $f(b_i, c_i, d_i)$. Adder 63 performs an addition operation on derived word $W_i$, entry $K_i$, rotated word $a_i$, and output $f(b_i, c_i, d_i)$ to yield sum $W_i+K_i+a_i+f(b_i, c_i, d_i)$. Rotator 64 transmits the output of adder 63 to produce rotated sum $W_i+K_i+a_i+f(b_i, c_i, d_i)$. Multiplexer 68 transmits $e_i$. Adder 70 performs an addition operation on rotated sum $W_i+K_i+a_i+f(b_i, c_i, d_i)$ and word $e_i$ to generate result R.

Hash engine 20 may include more, fewer, or other features or may have an alternative configuration. For example, one or more adders 56, 60, and 62 in any suitable configuration may perform the functions of adder 63.

Figure 7:
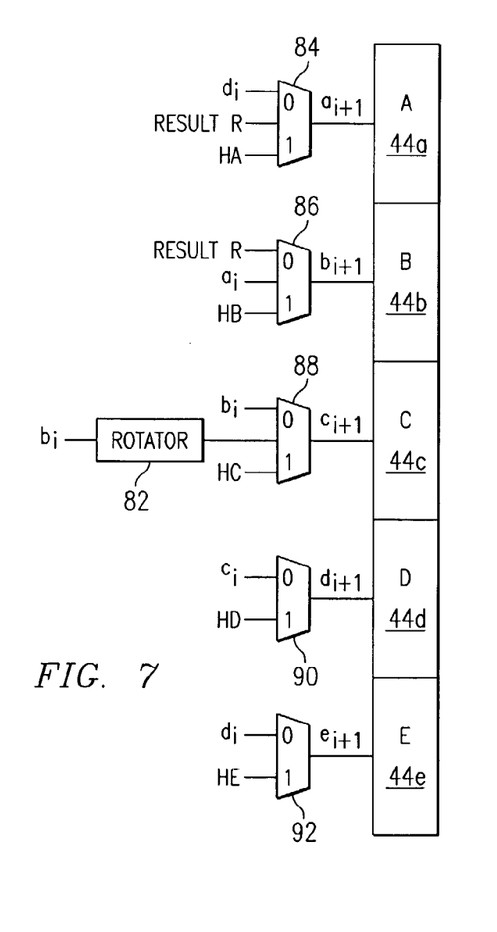
FIG. 7 is a block diagram illustrating one embodiment of the buffers of FIG. 1.

FIG. 7 is a block diagram illustrating one embodiment of buffers 44 of FIG. 1. According to one embodiment, a rotator 82 performs a circular shift rotation of word $b_i$ by thirty bits according to the SHA procedure. Multiplexers 84 through 92 transmit values according to the selected procedure. Multiplexer 84 transmits word $d_i$ for the MD5 procedure or result R for the SHA procedure. The transmitted value is multiplexed with chaining variable HA to generate word $a_{i+1}$ for the next step. Multiplexer 86 transmits result R for the MD5 procedure or word $a_i$ for the SHA procedure. The transmitted value is multiplexed with chaining variable HB to generate word $b_{i+1}$ for the next step.

Multiplexer 88 transmits word $b_i$ for the MD5 procedure or rotated word $b_i$ for the SHA procedure. The transmitted value is multiplexed with chaining variable HC to generate word $c_{i+1}$ for the next step. Multiplexer 90 transmits word $c_i$ for the MD5 or SHA procedure. The transmitted value is multiplexed with chaining variable HD to generate word $d_{i+1}$ for the next step. Multiplexer 92 transmits word $d_i$ for the MD5 or SHA procedure. The transmitted value is multiplexed with chaining variable HE to generate word $e_{i+1}$ for the next step.

Figure 8:
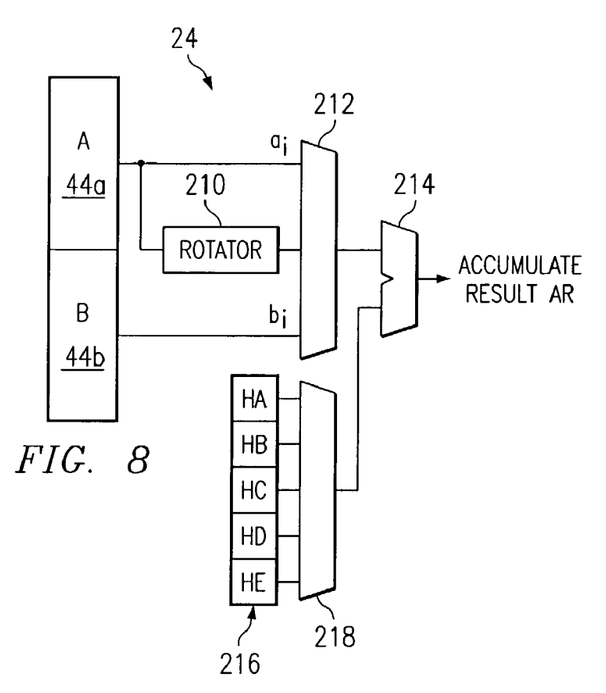
FIG. 8 is a block diagram illustrating one embodiment of the accumulate engine of FIG. 1.

FIG. 8 is a block diagram illustrating one embodiment of accumulate engine 24 of FIG. 1. Accumulate engine 24 generates an accumulate result using words from buffers 44 and chaining variables from chaining variable register file 26. Accumulate engine 24 selects words from a subset of buffers 44. The selected words are multiplexed with the chaining variables in order to generate an accumulate result AR for chaining variable register file 26.

Accumulate engine 24 includes a rotator 210 that performs a circular left rotation on a word received from buffer A. The rotation performed by rotator 210 corresponds to the rotation performed on word b according to the SHA procedure. A multiplexer 212 selects word $b_i$ if the MD5 is being performed, and selects rotated word $a_i$ or unrotated $a_i$ if the SHA procedure is being performed. Output buffers 216 store chaining variables that have been processed according to either the MD5 procedure or the SHA procedure. A multiplexer 218 multiplexes the chaining variables received from output buffers 216. Adder 214 adds the outputs of multiplexers 212 and 218 to generate the accumulate result AR.

Referring back to FIG. 3, diagram 150 may be used to explain how words a, b, c, and d may be collected from a subset of buffers 44 according to the MD5 procedure. For example, at the third step before the last step, word a is collected from buffer B. At the second step before the last step, word d is collected from buffer B. Similarly, at the step before the last step, word c is collected from buffer B, and at the last step, word b is collected from buffer B.

TABLE 1 provides an example of updating and selecting chaining variables at cycles 61 through 64 according to the MD5 procedure.

TABLE 1

| Cycle | Update and Select Chaining Variable | Select from Buffer |
|---|---|---|
| 61 | HA | B |
| 62 | HD | B |
| 63 | HC | B |
| 64 | HB | B |

Referring back to FIG. 4, diagram 160 may be used to explain how a subset of buffers 44 may be used to collect words a, b, c, d, and e according to SHA procedure. At the fourth step before the last step, word e is collected from rotated buffer A. At the third step before the last step, word d is collected from rotated buffer A. Similarly, at the second step before the last step, word c is collected from rotated buffer A, at the step before the last step, word b is collected from buffer A, and at the last step, word a is collected from buffer A. TABLE 2 summarizes the updating and selecting of chaining variables of cycles 76 through 80 according to the SHA procedure.

TABLE 2

| Cycle | Update and Selected Chaining Variable | Select from Buffer |
|---|---|---|
| 76 | HE | $A_{ROT}$ |
| 77 | HD | $A_{ROT}$ |
| 78 | HC | $A_{ROT}$ |
| 79 | HB | A |
| 80 | HA | A |

Accumulate engine 24 may be modified without departing from the scope of the invention. For example, words may be collected from more or fewer buffers. Collecting words from more than one buffer, for example, from buffers A and B, may improve the efficiency of collection, while collecting words from a subset of buffers may require less hardware.

Figure 9:
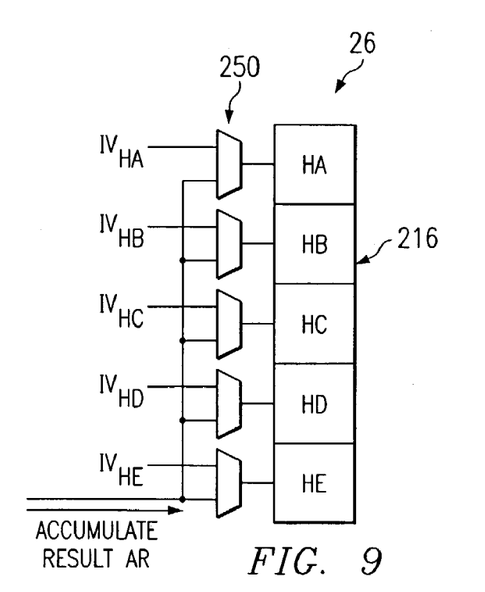
FIG. 9 is a block diagram of one embodiment of the chaining variable register file of FIG. 1.

FIG. 9 is a block diagram of one embodiment of a chaining variable register file 26 of FIG. 1. Chaining variable register file 26 generates chaining variables using an accumulate result received from accumulate engine 24. Chaining variable register file 26 includes multiplexers 250 that multiplex initial values $IV_{HX}$ of chaining variables HX, where X=A, B, C, D, and E, and accumulate result AR received from accumulate engine 24 to update chaining variable registers 216. The output of chaining variable registers 216 is sent to accumulate engine 24.

Figure 10:
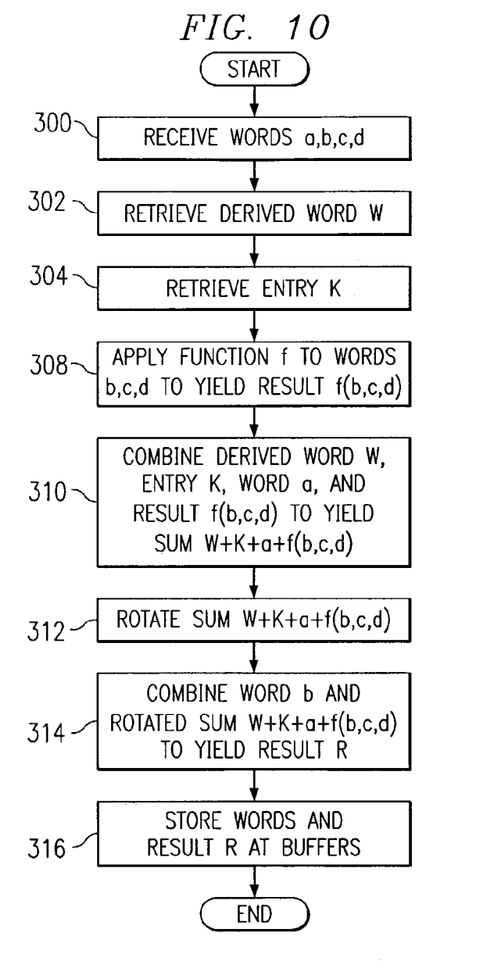
FIG. 10 is a flowchart illustrating one embodiment of a method for generating a message digest according to the MD5 procedure.

FIG. 10 is a flowchart illustrating one embodiment of a method for generating a chaining variable according to the MD5 procedure. The method begins at step 300, where words a, b, c, and d are received. Derived word W is retrieved by word deriver 38 at step 302. Entry K is retrieved by entry retriever 42 at step 304.

A function f is applied to words b, c, and d to yield output f(b,c,d) at step 308. Function module 58 may be used to apply function f to words b, c, and d. Derived word W, entry K, word a, and output f(b,c,d) are combined at step 310 to yield sum W+K+a+f(b,c,d). Sum W+K+a+f(b,c,d) is rotated at step 312. Word b and rotated sum W+K+a+f(b,c,d) are combined at step 314 to yield result R. The result R and words b, c, and d are stored at buffer 44 at step 316. After storing the result, the method terminates.

Figure 11:
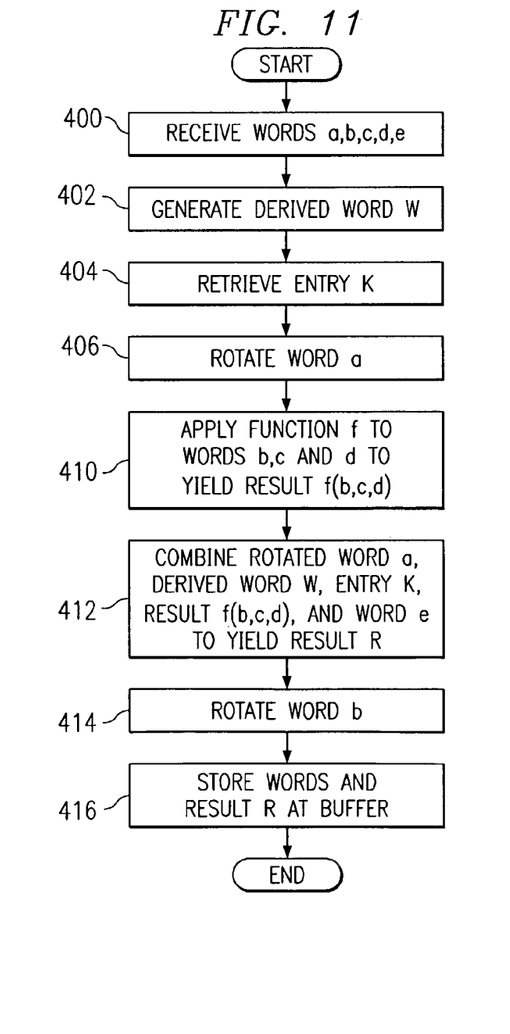
FIG. 11 is a flowchart illustrating one embodiment of a method for generating a message digest according to the SHA procedure.

FIG. 11 is a flowchart illustrating one embodiment of a method for generating a chaining variable according to the SHA procedure. The method begins at step 400, where words a, b, c, d, and e are received. Derived word W is generated by word deriver 38 at step 402. Entry K is retrieved by entry retriever 42 at step 404. Hash engine 20 rotates word a at step 406.

A function f is applied to words b, c, and d to yield output f(b,c,d) at step 410. Function module 58 of hash engine 20 may be used to apply function f to words b, c, and d. Rotated word a, derived word W, entry K, output f(b,c,d), and word e are combined at step 412 to yield result R. Word b is rotated at step 414. The words rotated b, c, d, and e and result R are stored at buffers 44 at step 416. After the storing the result, the method terminates.

Some of the steps of the methods may be omitted or others added without departing from the scope of the invention. Additionally, the steps may be performed simultaneously or in any suitable order. For example, retrieving entry K at step 304 may be performed before retrieving derived word W at step 302. As another example, rotating word a at step 406 may be performed before generating derived word W at step 402. Furthermore, the methods may be performed using any combination of hardware and/or software.

Certain embodiments of the invention may provide one or more technical advantages. A technical advantage of one embodiment may be that shared circuit components may be used to implement multiple hashing procedures. The shared circuit components may reduce the size of a circuit that performs multiple hashing procedures.

Although an embodiment of the invention and its advantages are described in detail, a person skilled in the art could make various alterations, additions, and omissions without departing from the spirit and scope of the present invention as defined by the appended claims.

What is claimed is:

1. A method for generating a message digest, comprising:
selecting a first hashing procedure or a second hashing procedure for a message comprising a plurality of words;
receiving the words at a hash engine comprising a function module and an adder;
performing the following for each step of a first number of steps to yield a first chaining variable if the first hashing procedure is selected:
applying a first function to a first subset of words at the function module to yield a first function output;
combining a second subset of words and the first function output at the adder to yield a first sum;
determining a rotation amount in accordance with a first entry;
rotating the first sum according to the rotation amount at a rotator; and
generating a plurality of next words in accordance with the first sum;
performing the following for each step of a second number of steps to yield a second chaining variable if the second hashing procedure is selected:
applying a second function to a third subset of words at the function module to yield a second function output;
combining a fourth subset of words and the second function output at the adder to yield a second sum;
rotating the second sum by a zero amount at the rotator; and
generating a plurality of next words in accordance with the second sum;
if the first hashing procedure is selected, generating a first message digest for the message to ensure data integrity, the message generated using the first chaining variable; and
if the second hashing procedure is selected, generating a second message digest for the message to ensure data integrity, the message generated using the second chaining variable;
repeating at a message array:
storing a fifth subset of words;
selecting a sixth subset of words from the fifth subset of words;
performing an exclusive-or operation on the sixth subset of words at an exclusive-or gate to generate a derived word; and
storing the derived word by writing over a word of the fifth subset of words.

2. The method of claim 1, wherein:
the first hashing procedure comprises a Message-Digest hashing procedure; and
the second hashing procedure comprises a Secured Hash Algorithm procedure.

3. The method of claim 1, further comprising repeating the following to generate a predetermined number of derived words:
determining a derived word for a current round;
determining a derived word for a next round during the current round; and
storing the derived word for the next round by writing over the derived word for the current round.

4. The method of claim 1, further comprising:
receiving a first entry comprising a word selected from a table; and
combining the first entry and a word of the first subset of words.

5. The method of claim 1, further comprising:
selecting a word generated at a final round from a buffer of a plurality of buffers, each buffer operable to store a word;
generating a word of a chaining variable using the word generated at the final round; and
repeating the following until a final step of the final round:

selecting a next word generated at the final round from the buffer of the plurality of buffers; and generating a next word of the chaining variable using the next word generated at the final round.

6. A system for generating a message digest, comprising:
a register operable to receive a message comprising a plurality of words; and
a hash engine coupled to the register and comprising a function module and an adder, the hash engine operable to:
perform the following for each step of a first number of steps to yield a first chaining variable if the first hashing procedure is selected:
apply a first function to a first subset of words at the function module to yield a first function output;
combine a second subset of words and the first function output at the adder to yield a first sum;
determine a rotation amount in accordance with a first entry;
rotate the first sum according to the rotation amount at a rotator; and
generate a plurality of next words in accordance with the first sum;
perform the following for each step of a second number of steps to yield a second chaining variable if the second hashing procedure is selected:
apply a second function to a third subset of words at the function module to yield a second function output;
combine a fourth subset of words and the second function output at the adder to yield a second sum;
rotate the second sum by a zero amount at the rotator; and
generate a plurality of next words in accordance with the second sum;
if the first hashing procedure is selected, generate a first message digest for the message to ensure data integrity, the message generated using the first chaining variable; and
if the second hashing procedure is selected, generate a second message digest for the message to ensure data integrity, the message generated using the second chaining variable if the second hashing procedure is selected;
a message array operable to repeat:
store a fifth subset of words;
select a sixth subset of words from the fifth subset of words;
perform an exclusive-or operation on the sixth subset of words at an exclusive-or gate to generate a derived word; and
store the derived word by writing over a word of the fifth subset of words.

7. The system of claim 6, wherein:
the first hashing procedure comprises a Message-Digest hashing procedure; and
the second hashing procedure comprises a Secured Hash Algorithm procedure.

8. The system of claim 6, further comprising a message array operable to repeat the following to generate a predetermined number of derived words:
determining a derived word for a current round;
determining a derived word for a next round during the current round; and
storing the derived word for the next round by writing over the derived word for the current round.

9. The system of claim 6, wherein the hash engine is further operable to:
receive a first entry comprising a word selected from a table; and
combine the first entry and a word of the first subset of words.

10. The system of claim 6, further comprising an accumulate engine operable to:
select a word generated at a final round from a buffer of a plurality of buffers, each buffer operable to store a word;
generate a word of a chaining variable using the word generated at the final round; and
repeat the following until a final step of the final round:
selecting a next word generated at the final round from the buffer of the plurality of buffers; and
generating a next word of the chaining variable using the next word generated at the final round.

* * * * *